United States Patent [19]

Holmes

[11] 4,291,395

[45] Sep. 22, 1981

[54] FLUID OSCILLATOR

[75] Inventor: Allen B. Holmes, Rockville, Md.

[73] Assignee: The United States of America as represented by the Secretary of the Army, Washington, D.C.

[21] Appl. No.: 64,451

[22] Filed: Aug. 7, 1979

[51] Int. Cl.$^3$ .............................................. G01V 1/40

[52] U.S. Cl. .................................... 367/83; 181/119; 137/813; 137/835

[58] Field of Search ........ 137/804, 805, 807, 808-813, 137/814, 826, 831, 835, 836, 838; 175/65; 340/18 LD

[56] References Cited

U.S. PATENT DOCUMENTS

| | | | |
|---|---|---|---|
| 3,016,066 | 1/1962 | Warren | 137/835 X |
| 3,217,727 | 11/1965 | Spyropoulos | 137/835 X |
| 3,238,960 | 3/1966 | Hatch, Jr. | 137/835 X |
| 3,247,861 | 4/1966 | Bauer | 137/835 X |
| 3,529,612 | 9/1970 | Rausch | 137/836 X |
| 3,674,044 | 7/1972 | Mayer | 137/812 |
| 4,134,100 | 1/1979 | Funke | 137/836 X |

*Primary Examiner*—William R. Cline

*Attorney, Agent, or Firm*—Nathan Edelberg; Robert P. Gibson; Saul Elbaum

[57] ABSTRACT

A telemetry system is disclosed which utilizes a fluid feedback oscillator in conjunction with a flow restricting device in order to generate pulses in a fluid. Means are provided to turn the oscillator on or off or to vary the frequency of oscillation, thereby permitting the transmission of information by means of the fluid pulses.

6 Claims, 4 Drawing Figures

FIG. 3
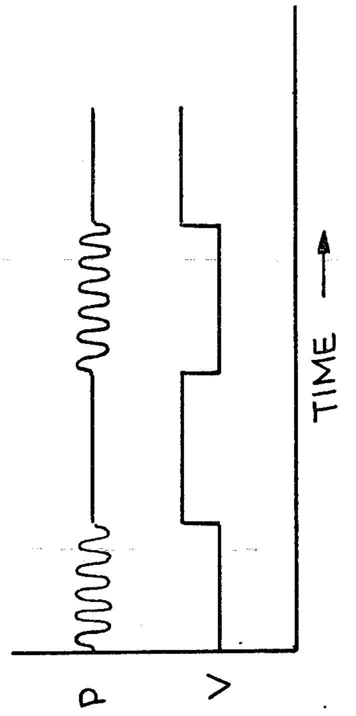
FIG. 4
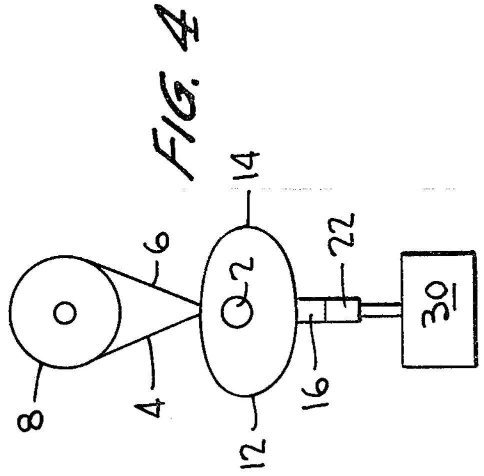
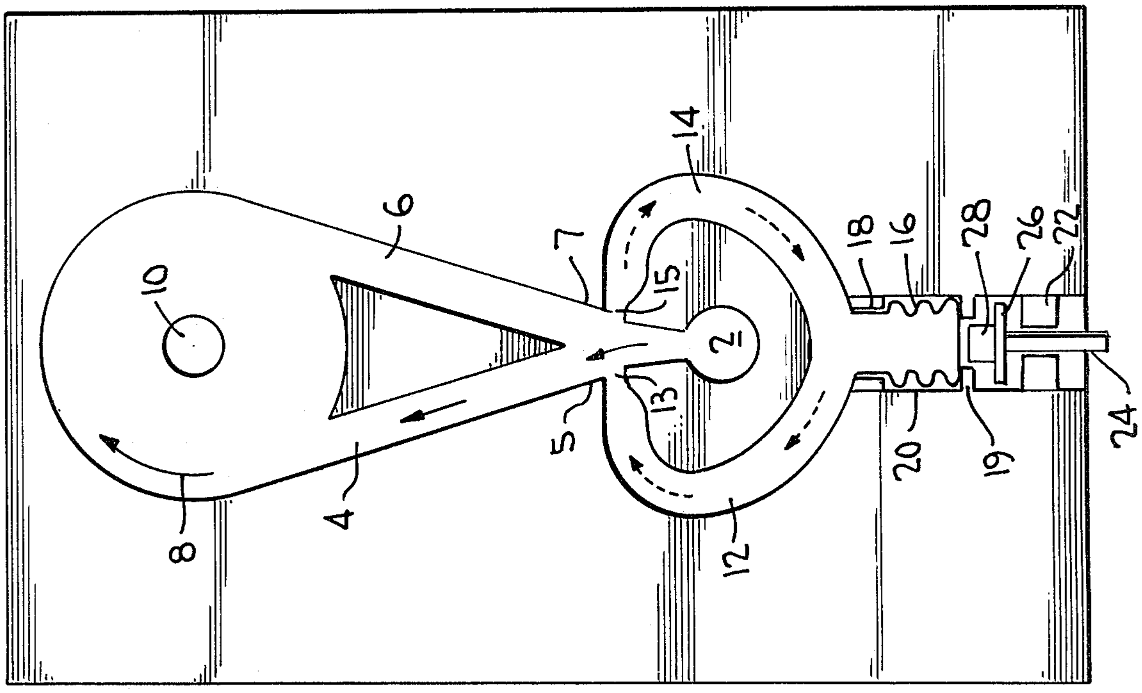
FIG. 2

FLUID OSCILLATOR

RIGHTS OF THE GOVERNMENT

The invention described herein may be manufactured, used, and licensed by or for the United States Government for governmental purposes without the payment to me of any royalty thereon.

BACKGROUND OF THE INVENTION

The invention relates to systems for transmitting information from the bottom of a bore hole in the earth to the surface by way of pressure pulses created in a circulating mud stream in a drill string. More particularly, this invention relates to an apparatus for changing the resistance to the flow of the mud stream in the drill string to create pressure pulses therein.

The usefulness of obtaining data from the bottom of an oil, gas or geothermal well during drilling operations without interrupting these operations has been recognized for many years. However, no proven technology reliably provides this capability. Such a capability would have numerous benefits in providing for safer and less costly drilling of both exploration and production wells.

Any system that provides measurements while drilling (MWD) must have 3 basic capabilities: (1) to measure the down hole perameters of interest; (2) telemeter the resulting data to a surface receiver; and (3) to receive and interpret the telemetered data.

Of these 3 essential capabilities, the ability to telemeter data to the surface is currently the limiting factor in the development of an MWD system.

For reasons of economy and safety it is highly desirable that the operator of a drill string be continually aware of such down hole parameters as drill bit position, temperature, and bore hole pressure. Knowledge of the drill bit position during drilling would save significant time and expense during directional drilling operations. For safety it is of interest to predict the approach of high pressure zones to allow the execution of proper preventative procedures in order to avoid blowouts. In addition proper operation of the drill string requires continuous monitoring of down hole pressure. The pressure in the bore hole must be maintained high enough to keep the walls of the hole from collapsing on the drill string yet low enough to prevent fracturing of the formation around the bore hole. In addition, the pressure at the bit must be sufficient to prevent the influx of gas or fluids when high pressure formations are entered by the drill bit. Failure to maintain the proper down hole pressure can, and frequently does, lead to loss of well control and blowouts.

Four general methods are being studied that would provide transmission of precise data from one end of the well to another: mud pressure pulse, hard wire, electromagnetic waves, and acoustic methods. At this time, the mud pressure pulse method seems to be the closest to becoming commercially available.

In a typical mud pulsing system pressure pulses are produced by a mechanical valve located in a collar above the drill bit. The pulses represent coded information from down hole instrumentation. The pulses are transmitted through the mud to pressure transducers at the surface, decoded and displayed as data representing pressure, temperature, etc. from the down hole sensors. Of the four general methods named above mud pulse sensing is considered to be the most practical as it is the simplest to implement and requires no modification of existing drill pipe or equipment.

U.S. Pat. No. 4,134,100 discloses a mud pulse transmitter which utilizes a fluidic feedback oscillator in conjunction with a vortex chamber to generate mud pulses. The oscillator of the patent comprises dual feedback paths, and thus requires multiple control means and somewhat complex control circuitry. Also, since one outlet path of the oscillator directs fluid flow into the vortex chamber while the other outlet path from the oscillator directs fluid flow into a bypass, the oscillator is capable of providing only one pressure pulse for each complete oscillation of the fluid flow.

OBJECT OF THE INVENTION

Accordingly it is an object of the invention to provide means for producing pressure pulses in a fluid line. It is also an object of the invention to provide an easy and practical way of controlling the frequency and output of the pulses.

It is another object of this invention to provide a system that can be used to transmit signals through a fluid body in a digital or a frequency modulated mode.

It is a further object of the invention to provide a fluid telemetry system particularly adaptable for use in conjunction with a drill string to provide measurements of down hole parameters while drilling.

It is yet another object of the invention to provide a fluid telemetry system capable of generating a frequency of pulses greater than that of heretofore known systems.

SUMMARY OF THE INVENTION

The system of the invention utilizes a fluid feedback oscillator having a single feedback loop for causing oscillation of the fluid flow within the device. Both output paths from the oscillator are in fluid communication with the vortex chamber which selectively impedes the flow of fluid through the oscillator. Means are provided in the feedback loop for controlling or stopping the frequency of oscillations of the fluid.

BRIEF DESCRIPTION OF THE DRAWINGS

FIG. 2 is a detailed view of the pulser-oscillator of the invention.

FIG. 3 is a graphical representation of the interrelationship between an applied control voltage and pulse output of the device of the invention.

FIG. 4 is a schematic showing of the interrelationship between the pulser-oscillator, control means of the invention, and the instrumentation of the telemetry system.

DESCRIPTION OF THE PREFERRED EMBODIMENT

Figure 1:
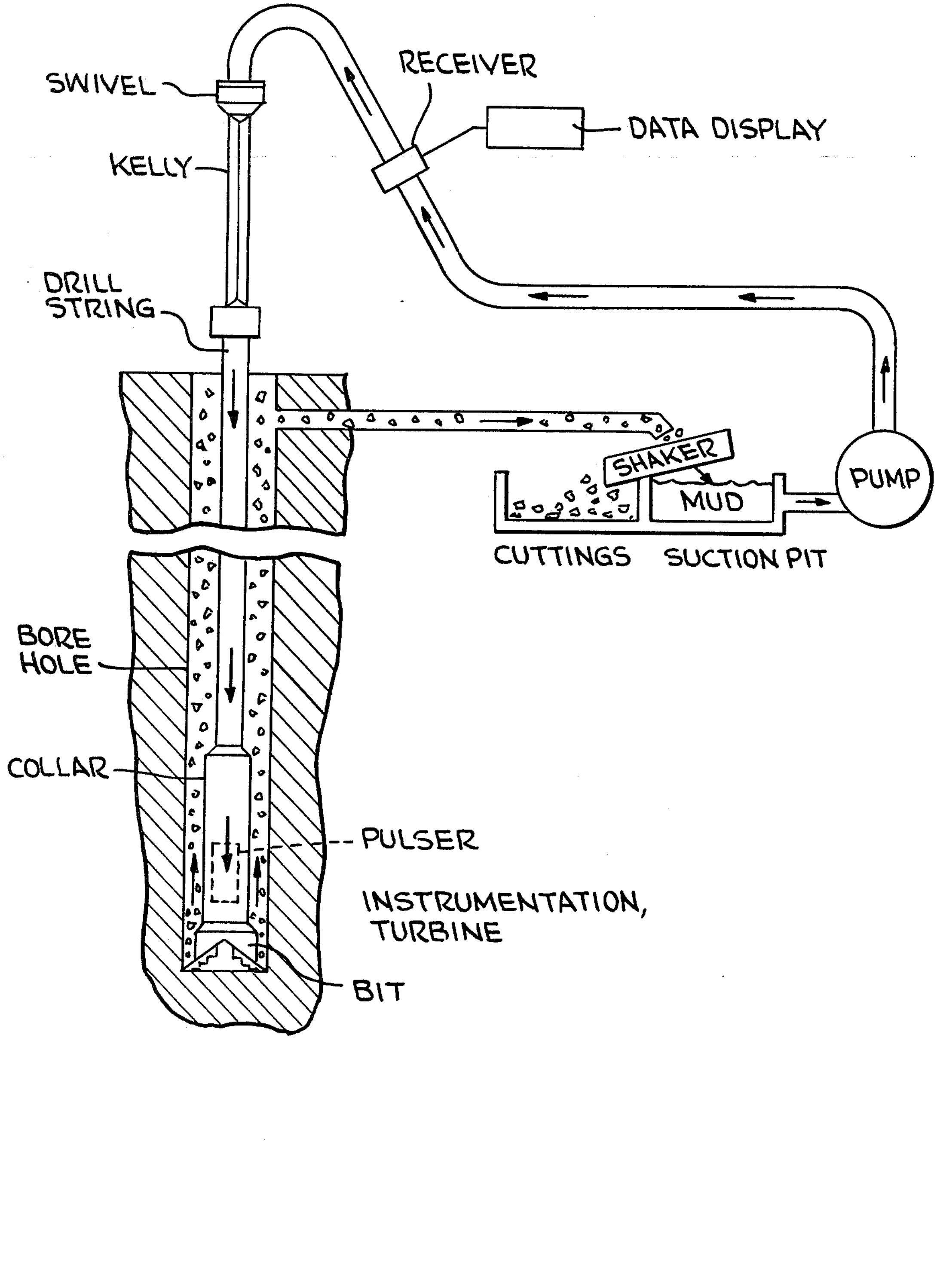
FIG. 1 is a schematic view showing the relationship between the elements of the telemetry system and a drill string.

Referring to FIG. 1, there is shown the general arrangement of the drill string comprising a telemetry system. As the drill string operates to continually increase the depth of the bore hole, a fluid, commonly called mud, is pumped down through the drill string past the drill bit to carry cuttings back up to the surface of the bore hole where they are then separated from the mud. The mud is then recirculated down through the drill string. Mounted generally near the base of the drill string, adjacent the drill bit, is an instrumentation package generally comprising transducers capable of sensing physical parameters in the bore hole.

A pulser is provided in the drill string generally adjacent the instrumentation package for generating pulses in the fluid mud.

A pressure transducer, generally denoted as a receiver in FIG. 1, is provided for receiving the pulses in the mud at a location in the drill string generally above the ground level. The data display or recording device is associated with the receiver.

In a complete mud pulse telemetry system the pressure signals will be monitored at the surface by the pressure transducer. Electrical power to operate the pulser and down hole electronics will be supplied by a mud turbine driven generator as shown in FIG. 1. Measurements made down hole will be coded and fed to a control means. The control means regulates the output of pulses by the pulsing device, such pulses being received by the pressure transducer. The signals received at the pressure transducer will be decoded and displayed as data.

FIG. 2 shows in greater detail the structure of the oscillator-pulser of the invention. The device comprises a fluid oscillator combined with the vortex valve. The structure and function of fluid oscillators are generally known in the art, as evidenced by U.S. Pat. No. 3,016,066.

The device of the invention comprises an inlet 2 which receives at least a portion of the mud flowing through the drill string, and outlets 4 and 6. Each outlet leads into the vortex chamber 8. The outlet 10 from the vortex chamber is oriented axially with respect to the vortex generated in the chamber by fluid flow. Control ports 13, 15 are arranged on opposite sides of the inlet flow from inlet 2. Feedback loop 12, 14 connects the control ports 13, 15 with one another.

A control means comprises an expansible element 16 shown as a bellows, and secured in fluid communication with a feedback loop by element 18. Means are provided to constrain expansion of the expansible element. As an example of suitable such means there is shown a solenoid comprising coil 22, armature 24, element 28 secured to the armature 24 and adapted to contact the expansible element to constrain the expansion thereof. Disc 26, also secured to armature 24, cooperates with ridge 19 to limit the travel of the armature 24. It is to be understood that, although the constraining means is shown as an electrically operated device, such constraining means could also be mechanically or pneumatically operated.

All of the elements as shown in FIG. 2 can be readily formed by cutting or milling the various passages in a block or sheet of plastic or metallic material, and covering such block or sheet with a cover element as shown generally in the above mentioned U.S. Pat. No. 3,016,066.

In operation fluid enters inlet 2 and assumes a flow path, for example, through the outlet 4 by attaching to the wall of the oscillator in the region of wall portion 5 as shown in FIG. 2. Flow through outlet 4 will create a clockwise vortical flow in the chamber 8 as shown in solid arrows in FIG. 2. During the vortical flow in the chamber 8, fluid flow through the outlet 10 is restricted, thus restricting the total flow through the oscillator.

The flow from inlet 2 through the outlet 4 creates a low pressure region in the area of the control port 13, and a correspondingly higher pressure region on the side of the flow path facing control port 15. The flow thus generates a pressure wave which propagates through the feedback loop 14, 12 in the direction of dotted arrows shown in FIG. 2, from the higher pressure region to the lower pressure region. The pressure wave traveling through the feedback loop will create a pressure buildup in the region of the control port 13. This pressure buildup in the region of control port 13 and wall 5' will cause the fluid flow in outlet 4 to be diverted toward outlet 6. As the fluid assumes a flow path through outlet 6 the process is repeated and a low pressure will develop at control port 15 while a correspondingly higher pressure will develop in the region of control port 13. A pressure wave will then travel in the opposite direction through the feedback loop 12, 14 toward the control port 15. The higher pressure thus generated in the region of control point 15 and wall 7 will again divert the flow back toward path 4. In this manner the flow will continually oscillate between the flow paths 4 and 6.

When the fluid flows through outlet 4 a clockwise vortex will be generated in chamber 8, as shown in solid arrows in FIG. 2. When the fluid flow is diverted to outlet 6, the clockwise vortex will be caused to decay, and a counter clockwise vortex will be generated by the flow through the output 6. While the flow in chamber 8 is vortical in either the clockwise or counter clockwise directions the flow through outlet 10 of the chamber is restricted by such vortical flow. However, as the vortical motion decays and the vortical velocity passes through the value zero, the flow through outlet 10 is naturally increased due to the lessened resistance caused by decay of the vortical flow.

The change in flow rate that occurs in the vortex chamber as a result of the reversal of the vortical flow produces a change in the kinetic energy of the fluid entering the pulser. This energy is expanded in compressing the fluid. A wave of increased pressure (water hammer) is produced which propagates back through the pulser inlet 2, and up through the drill string. The amplitude of the wave is primarily a function of the fluid mud density and the change in velocity caused by the reduction in flow.

The expansible means 16 is necessary to control the speed of the propogation of the pressure waves through the feedback loop 12, 14 in order to enable the pulser to generate pulses in the manner described above. Ordinarily, the pressure waves will travel through the feedback loop at the speed of sound, causing a very high frequency of oscillation of fluid flow between the outlet paths 4 and 6. If the oscillation is permitted to occur at such a rapid rate, fluid flow through either of the paths 4 or 6 will not remain stable long enough to generate a vortex in the chamber 8. The result would likely be a somewhat turbulent but steady state flow through the vortex chamber.

Provision of an expansible element in the feedback loop permits the effective volume of the loop to increase in response to the pressure pulses therein, thus lengthening the period required for the waves in the loop to transverse the loop, effectively slowing the rate of travel of the waves from one control port to the other. Thus, while the fluid flows through outlet 4, as shown in FIG. 2, the rate of travel of the wave through the feedback loop from control port 15 to control port 13 will be sufficiently slowed by expansion of the bellows 16, to enable flow through outlet 4 to generate a sufficient vortex in chamber 8 before the flow is diverted to outlet 6. Similarly, the flow will be permitted to remain through the outlet 6 for a period sufficient to reverse the vortex in the chamber 8. Therefore the continual reversals of the vortical flow in chamber 8 will be permitted to occur, thus generating pulses in the fluid flow through the oscillator as previously set forth.

If the control voltage is applied to the coil 22 causing element 28 to restrict the expansion of bellow 16 the pressure wave will again travel through the feedback loop at a rate which is too rapid to permit reversal of the vortical flow in chamber 8. The result will be that no pulses will be generated in the flow through the oscillator.

FIG. 3 is a graphical representation of the relationship between the pulse output and the control voltage applied to solenoid means 22, 24. It can be seen that when the control signal is applied to the solenoid to constrain expansion of the bellow 16, there are no pulses produced by the oscillator and vortex chamber. When the signal is removed the output pulses again resume.

FIG. 3 illustrates how the pulses are turned on or off by the constraining means 28. In addition, the constraining means can be used to modulate the frequency of oscillation of the flow through the oscillator, thus varying the frequency of the output pulses.

If a variable force is applied to the bellows by means of constraining element 28, the period of propogation of the wave through the feedback loop can be varied. When the period of travel of the wave in the feedback loop is too short, there will be no output from the pulser, as described above. When the period is increased and the frequency of travel of the wave in the feedback loop is caused to fall below a certain threshold rate by allowing expansion of the element 16, pulses will begin to be generated by the pulsing device. By allowing greater expansion of the element 16, the pulse output rate of the device will be slowed. The device of the invention is thus capable of being used to transmit signals in either a digital or a frequency modulated mode.

In addition to being capable of a dual mode of data transmission the device of the invention is also capable of more rapid pulse rates than the devices of the prior art, as represented by the device of U.S. Pat. No. 4,134,100. The device of the present invention generates a pressure pulse for each half cycle of oscillation. The device of the referenced patent is capable of generating a pulse only for each complete cycle of oscillation.

We wish it to be understood that we do not desire to be limited to the exact details of construction shown and described, for obvious modifications can be made by a person skilled in the art.

What we claim is:

1. A pulsing device having an inlet and alternate paths for fluid flow and means for generating pulses in a fluid entering said inlet and flowing through said device, comprising fluid feedback oscillating means for directing the fluid flow from said inlet to said alternate paths, and vortex valve means in communication with said paths for alternately increasing and decreasing resistance to fluid flow received from said alternate paths by reversal of vortical flow to generate said pulses, pulse regulating means for increasing the frequency of oscillation of said fluid feedback oscillating means above a threshold level precluding reversal of vortical flow for preventing generation of said pulses, said pulse regulating means comprising means for regulating the frequency of oscillation of said fluid feedback oscillating means below said threshold level to control the rate at which said pulses are generated.

2. A device as in claim 1 wherein said paths communicate with the vortex valve in such manner that flow from a first or second of said alternate paths will generate vortical flow in said valve in a first or second vortical direction, respectively, intermittently restricting flow through said vortex valve, said alternate paths and said inlet, thereby generating said pulses in the fluid entering said inlet and flowing through said device.

3. A device as in claim 1 wherein said fluid feedback oscillating means comprises a control port associated with each of said alternate paths, and a feedback loop of fixed length connecting said control ports to one another, wherein said pulse regulating means comprises means associated with said feedback loop to regulate the period required for a pressure wave to propagate between said control ports.

4. A device as in claim 3 wherein said pulse regulating means comprises an expansible element associated with said feedback loop and means to control the degree of expansion of said element.

5. A telemetry apparatus comprising means to gather data at a first location along a fluid body and provide signals indicative of such data, means responsive to said signals to generate pulses in the fluid body, and means to receive said pulses at a second location along said fluid body remote from said first location, wherein said means to generate pulses comprises a pulsing device having an inlet and alternate paths for fluid flow and means for generating pulses in a fluid entering said inlet and flowing through said device, comprising fluid feedback oscillating means for directing the fluid flow from said inlet to said alternate paths, and vortex valve means in communication with said paths for alternately increasing and decreasing resistance to fluid flow received from said alternate paths by reversal of vortical flow to generate said pulses, pulse regulating means for increasing the frequency of oscillation of said fluid feedback oscillating means above a threshold level precluding reversal of vortical flow for preventing generation of said pulses, said pulse regulating means comprising means for regulating the frequency of oscillation of said fluid feedback oscillating means below said threshold level to control the rate at which said pulses are generated.

6. Apparatus as in claim 5 wherein said fluid body comprises fluid flowing through a drill string, said data gathering means is responsive to physical conditions at a first location in a bore hole and said means to receive the pulses is located outside of said bore hole whereby data from the interior of the bore hole may be telemetered to said location outside of the bore hole.

* * * * *